US012491888B2

United States Patent
Ucar et al.

(10) Patent No.: US 12,491,888 B2
(45) Date of Patent: Dec. 9, 2025

(54) VERIFICATION OF THE ORIGIN OF ABNORMAL DRIVING

(71) Applicant: TOYOTA MOTOR ENGINEERING & MANUFACTURING NORTH AMERICA, INC., Plano, TX (US)

(72) Inventors: Seyhan Ucar, Mountain View, CA (US); Tomohiro Matsuda, Mountain View, CA (US); Emrah Akin Sisbot, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 392 days.

(21) Appl. No.: 17/959,773

(22) Filed: Oct. 4, 2022

(65) Prior Publication Data

US 2024/0109540 A1    Apr. 4, 2024

(51) Int. Cl.
*B60W 40/04*        (2006.01)
*B60W 50/08*        (2020.01)

(52) U.S. Cl.
CPC ............ *B60W 40/04* (2013.01); *B60W 50/08* (2013.01); *B60W 2554/4046* (2020.02); *B60W 2556/45* (2020.02)

(58) Field of Classification Search
CPC ................ B60W 40/04; B60W 50/08; B60W 2554/4046; B60W 2556/45;
(Continued)

(56) References Cited

U.S. PATENT DOCUMENTS 10,077,050 B2    9/2018 Rajvanshi
10,311,749 B1    6/2019 Kypri
(Continued)

FOREIGN PATENT DOCUMENTS

WO    2021145367 A1    7/2021

OTHER PUBLICATIONS

Zohrevand et al., "Should I Raise the Red Flag? An Analytic Review of Anomaly Scoring Methods toward Mitigating False Alarms," Apr. 14, 2019, 11 pages (https://arxiv.org/abs/1904.06646).
(Continued)

*Primary Examiner* — Jelani A Smith
*Assistant Examiner* — Alyssa Rorie
(74) *Attorney, Agent, or Firm* — SHEPPARD, MULLIN, RICHTER & HAMPTON LLP; Daniel N. Yannuzzi

(57) ABSTRACT

Systems and methods are provided for programmatically verifying an origin of abnormal driving. Some examples of abnormal driving may include aggressive driving (e.g., tailgating, cut-in lane, etc.), distracted driving (e.g., swerving, delayed reaction, etc.), and reckless driving (e.g., green light running, lane change without signaling, etc.). For example, the systems and methods may receive an identification of a second vehicle performing abnormal driving from an ego vehicle; initiate a verification process of the identification of the abnormal driving; access driving data associated with an origin of the abnormal driving, wherein the driving data includes the ego vehicle and the second vehicle; using the driving data, determine a confirm or deny decision regarding the identification of the second vehicle from the ego vehicle; and provide the confirm or deny decision.

20 Claims, 6 Drawing Sheets

(58) Field of Classification Search
CPC ... B60W 2554/4042; B60W 2554/801; B60W 2554/802; B60W 2556/50; B60W 40/09
See application file for complete search history.

(56) References Cited

U.S. PATENT DOCUMENTS

| | | | |
|---|---|---|---|
| 11,380,198 B2 | 7/2022 | Ucar | |
| 11,414,088 B2 | 8/2022 | Ucar | |
| 11,610,441 B1* | 3/2023 | Bernico | G06Q 40/08 |
| 2010/0066562 A1* | 3/2010 | Stahlin | G08G 1/162 |
| | | | 340/902 |
| 2016/0284212 A1* | 9/2016 | Tatourian | G08G 1/096775 |
| 2017/0057521 A1* | 3/2017 | Jain | B60W 40/09 |
| 2018/0257659 A1* | 9/2018 | Nguyen | G07C 5/0816 |
| 2018/0357484 A1 | 12/2018 | Omata | |
| 2019/0375420 A1* | 12/2019 | Hou | G06N 3/044 |
| 2020/0008028 A1 | 1/2020 | Yang | |
| 2021/0027630 A1* | 1/2021 | Fan | G08G 1/012 |
| 2022/0101726 A1* | 3/2022 | Fields | G08G 1/096741 |
| 2022/0126864 A1* | 4/2022 | Moustafa | H04W 4/46 |
| 2022/0363267 A1* | 11/2022 | Kristinsson | B60W 40/09 |
| 2023/0025414 A1* | 1/2023 | Ma | B60W 60/00188 |
| 2023/0373533 A1* | 11/2023 | Schmidt | G06V 10/764 |

OTHER PUBLICATIONS

Singh, "Critical Reasons for Crashes Investigated in the National Motor Vehicle Crash Causation Survey," Traffic Safety Facts Crash•Stats, Report No. DOT HS 812 506, Mar. 2018, National Highway Traffic Safety Administration (https://crashstats.nhtsa.dot.gov/Api/Public/Publication/812506).

"Distracted Driving in America: A Public Safety Crisis," Selective Insurance Group, Inc., 1 page (https://www.selective.com/~/media/Files/S/Selective-V2/documents/pdf-links/Distracted-Driving-Infographic.pdf).

"Global Status Report on Road Safety 2018," World Health Organization (WHO), Management of Noncommunicable Diseases, Disability, Violence and Injury Prevention (NVI), Jun. 17, 2018, 424 pages https://www.who.int/publications/i/item/9789241565684.

* cited by examiner

VERIFICATION OF THE ORIGIN OF ABNORMAL DRIVING

TECHNICAL FIELD

The present disclosure relates generally to verifying an anomaly vehicle or driver amongst connected or non-connected vehicles operated on a roadway.

DESCRIPTION OF RELATED ART

Some autonomous driving systems analyze objects in a roadway in which the vehicle (e.g., the ego vehicle) is traveling. The objects may be moveable objects, like other vehicles and drivers, or immovable objects like traffic lights and stop signs. When an object is acting without regard to the expected procedure, the vehicle may determine that the object is an anomaly. The object may be an anomaly by performing actions that are done in an unusual time (e.g., relative to a typical time for a particular geographic location) or an unusual location (e.g., relative to a typical location). For example, a vehicle that is exhibiting anomalous behavior includes performing an unusual action that does not typically occur or infrequently occurs relative to the types of actions that are typical for a particular geographic location. An occurrence of a vehicle exhibiting anomalous behavior in a roadway environment may jeopardize safety of various roadway participants (e.g., vehicles, drivers, passengers, pedestrians, bikers, etc.) and may reduce the overall efficiency of a transportation system.

BRIEF SUMMARY OF THE DISCLOSURE

Anomaly detection in vehicles operating on a roadway is beneficial to improving safety on roadways, reducing injuries, and improving efficiency of operating vehicles in the environment. Some examples of abnormal driving may include aggressive driving (e.g., tailgating, cut-in lane, etc.), distracted driving (e.g., swerving, delayed reaction, etc.), and reckless driving (e.g., green light running, lane change without signaling, etc.). A vehicle operating on the roadway may be equipped with anomaly detection (e.g., the ego vehicle) and determine predicted operations (e.g., from modeling or other predicted values, including predicted distance to the nearby other vehicle through the backup camera) that are generated from the sensor data to detect an identification of abnormal driving by other vehicles.

However, relying only on sensor data provided by the vehicle may not allow the system to determine a complete and accurate depiction of the environment. For example, the driving data could have noise or wrong data that may mislead the determination. In other examples, the driving behavior of the ego vehicle may mislead the abnormal driving detection of a second vehicle (e.g., the ego vehicle may be operating abnormally and may be the origin of the abnormal driving, not the second vehicle). As such, it is difficult to tell from the traditional anomaly detection systems alone, which vehicle is the cause or origin of the anomalous behavior. Without the determination of the origin of the anomalous behavior, the safety of innocent drivers in the nearby vicinity may still be jeopardized.

According to various embodiments of the disclosed technology, systems and methods are provided for programmatically verifying an origin of abnormal driving. Some examples of abnormal driving may include aggressive driving (e.g., tailgating, cut-in lane, etc.), distracted driving (e.g., swerving, delayed reaction, etc.), and reckless driving (e.g., green light running, lane change without signaling, etc.). For example, the systems and methods may receive an identification of a second vehicle performing abnormal driving from an ego vehicle; initiate a verification process of the identification of the abnormal driving; access driving data associated with an origin of the abnormal driving that includes the ego vehicle and the second vehicle; using the driving data, determine a confirm or deny decision regarding the identification of the second vehicle from the ego vehicle; and provide the confirm or deny decision (e.g., to the ego vehicle or to a remote operator).

In some examples, the system may be remote from the vehicle (e.g., the ego vehicle) detecting the abnormal driving of a second vehicle. The ego vehicle can use driver data or vehicle sensor data to identify abnormal driving and notify the remote system of its determination. The system may confirm or deny the decision made by the ego vehicle that has labeled the second vehicle as abnormally driving. In the verification process, the system can determine the true origin of the abnormal driving behavior by using at least some of the available data shared by connected vehicles to discover the root-cause of the abnormal driving. The system may distribute the identification of the abnormally driving, high-risk vehicle or driver information across the network to caution any impacted vehicles and so they may react accordingly.

The verification process to determine the origin of the abnormal driving may receive various data, including data from the ego vehicle, second vehicle, or other infrastructure elements. For example, the vehicle that detected the abnormal driving (e.g., the ego vehicle) can gather metadata associated with the detection results and send the metadata to the remote system. Metadata can include the set of parameters (e.g., distance, speed) used in the abnormal driving detection, the set of sensors (e.g., camera, radar) used to measure the parameters of the second vehicle, the type of algorithm (e.g., a time series analysis, pattern matching, machine learning) used to analyze the parameters, and a sample abnormal driving detection result. Vehicles can use Vehicle-to-X communication to transmit the metadata to the remote system and initiate the verification for the origin of abnormal driving (e.g., Vehicle-to-Vehicle (V2V), Vehicle-to-Infrastructure (V2I), Vehicle-to-Cloud (V2C), etc.).

Some systems that determine abnormal driving using anomaly detection are discussed in U.S. Pat. Nos. 11,380,198 and 11,414,088, which are incorporated by reference herein in their entirety.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Figure 1:
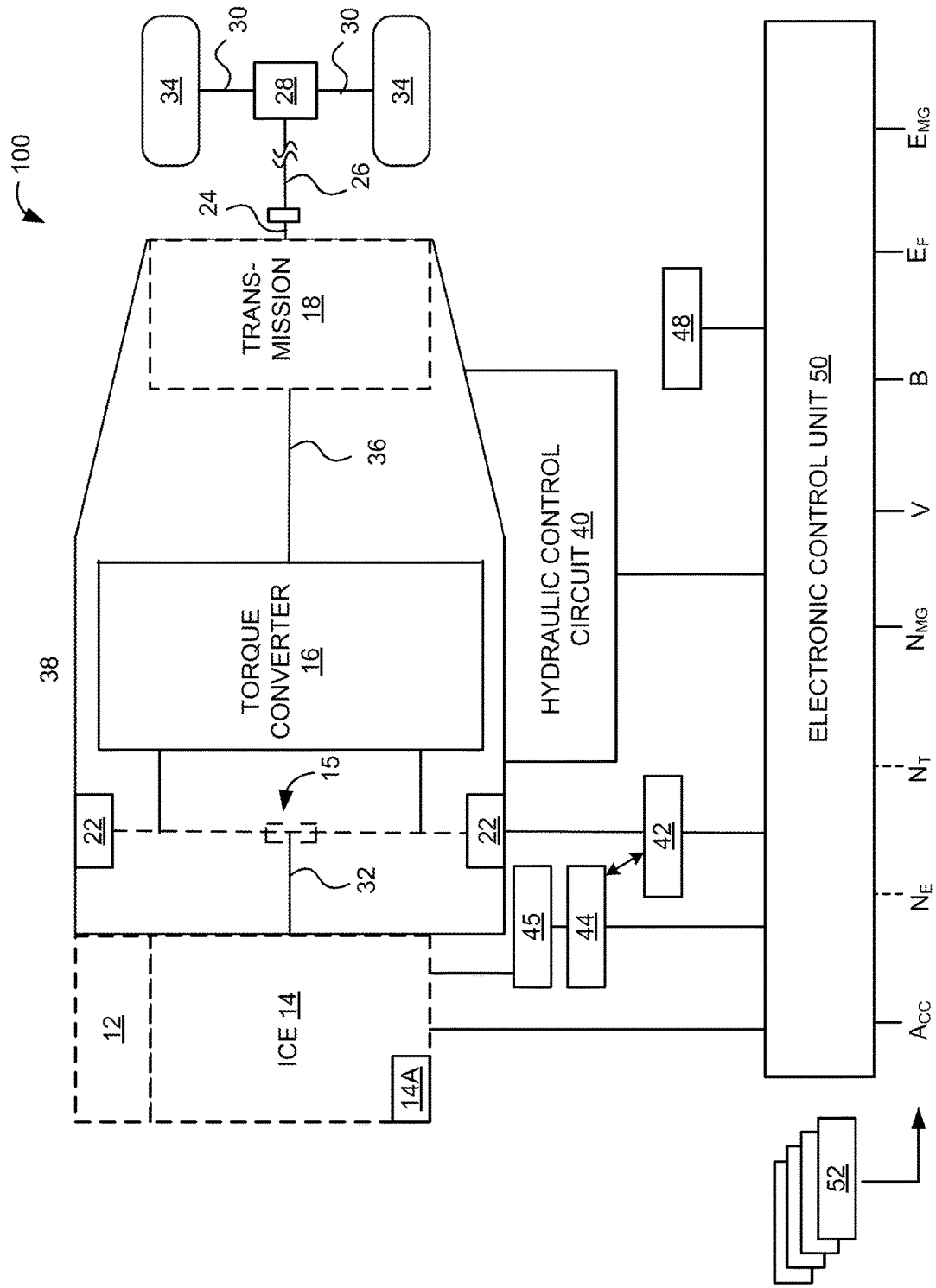
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for programmatically verifying the origin of abnormal driving can be implemented in other types of vehicles including gasoline- or diesel-powered vehicles, fuel-cell vehicles, electric vehicles, or other vehicles. Any of these vehicles may be implemented as a connected or non-connected vehicle.

FIG. 1 illustrates a drive system of vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and clutch 15 may be included to engage engine 14. In the EV travel mode, vehicle 100 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

Output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage battery charger 45. Battery 44 may also be charged by motor 22 such as, for example, by regenerative braking or by coasting during which time motor 22 operate as generator.

Motor 22 can be powered by battery 44 to generate a motive force to move vehicle 100 and adjust vehicle speed. Motor 22 can also function as a generator to generate electrical power such as, for example, when coasting or braking. Battery 44 may also be used to power other electrical or electronic systems in vehicle 100. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

Electronic control unit 50 (described below) may be included and may control the electric drive components of vehicle 100 as well as other vehicle components. For example, electronic control unit 50 may control inverter 42, adjust driving current supplied to motor 22, and adjust the current received from motor 22 during regenerative coasting and breaking. As a more particular example, output torque of motor 22 can be increased or decreased by electronic control unit 50 through inverter 42.

Torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of vehicle 100. In the illustrated example, crankshaft 32, which is an output member of engine 14, may be selectively coupled to motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit 40.

When clutch 15 is engaged, power transmission is provided in the power transmission path between crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of clutch 15.

As alluded to above, vehicle 100 may include electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in vehicle 100. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of motor 22 (motor rotational speed), and vehicle speed, V. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more sensors 52 may include their own processing capability to compute the results for additional information that can be provided to electronic control unit 50. In other embodiments, one or more sensors 52 may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
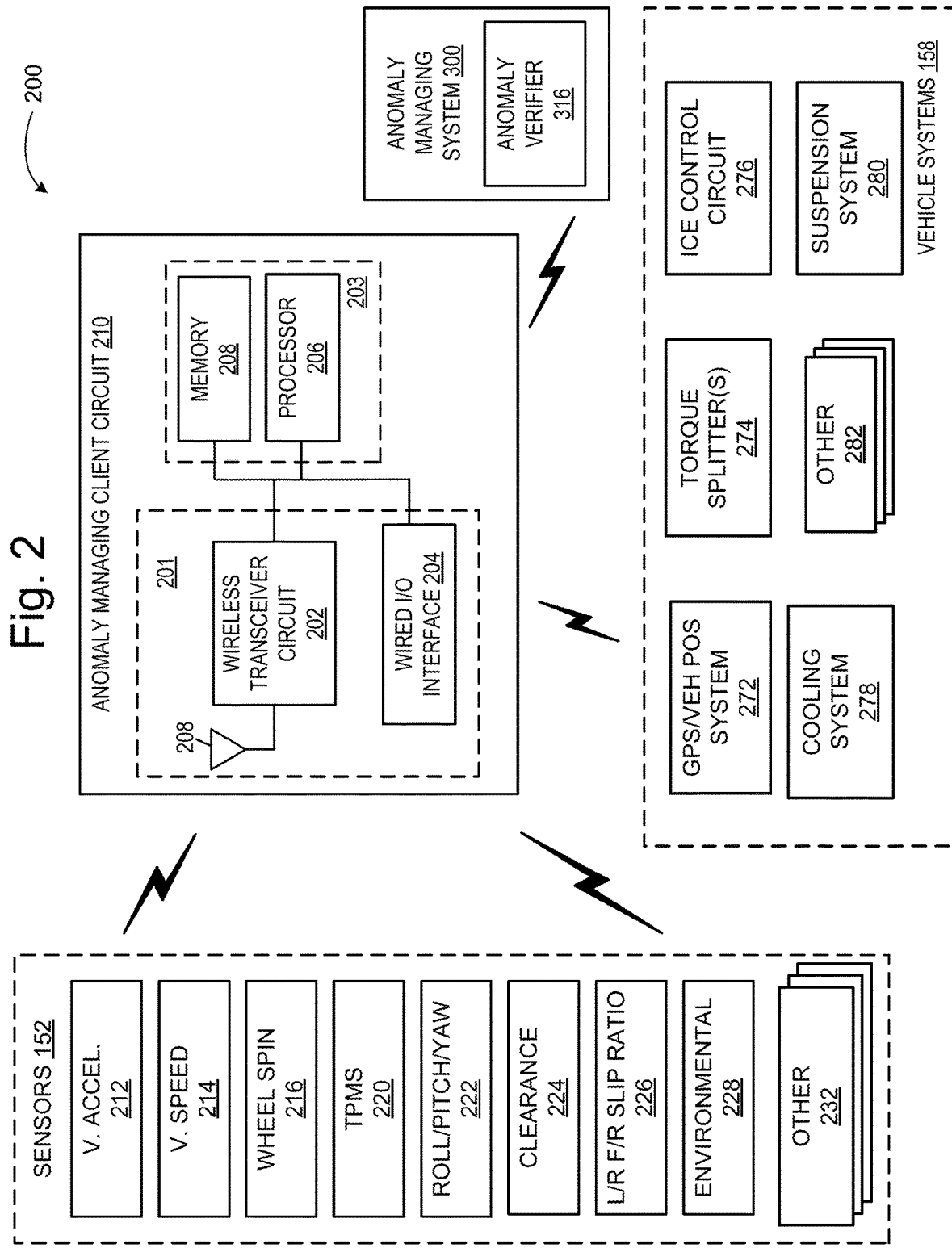
FIG. 2 illustrates an example vehicle architecture for implementing a verification process of the origin of abnormal driving in accordance with some embodiments of the systems and methods described herein.

FIG. 2 illustrates an example vehicle architecture for implementing a verification process of the origin of abnormal driving in accordance with some embodiments of the systems and methods described herein. In this example, vehicle 200 includes anomaly managing client circuit 210, sensors 152, and vehicle systems 158, in addition to or in replacement of other physical components illustrated in vehicle 100 of FIG. 1. Any of these components illustrated in FIG. 2 may electronically communicate with anomaly managing system 300 (comprising anomaly verifier 316 and other components), which is further described with FIG. 3.

Sensors 152 and vehicle systems 158 can communicate with anomaly managing client circuit 210 via a wired or wireless communication interface. Although sensors 152 and vehicle systems 158 are depicted as communicating with anomaly managing client circuit 210, they can also communicate with each other as well as with other vehicle systems. Anomaly managing client circuit 210 can be implemented as an ECU or as part of an ECU such as, for example electronic control unit 50 in FIG. 1. In other embodiments, anomaly managing client circuit 210 can be implemented independently of the ECU.

Anomaly managing client circuit 210, in this example, includes communication circuit 201, decision circuit 203 (including processor 206 and memory 208), and power supply (not shown). Components of anomaly managing client circuit 210 are illustrated as communicating with each other via a data bus, although other communication interfaces can be included.

Processor 206 can include one or more GPUs, CPUs, microprocessors, or any other suitable processing system. Processor 206 may include a single core or multicore processors. Memory 208 may include one or more various forms of memory or data storage (e.g., flash, RAM, etc.) that may be used to store the calibration parameters, images (analysis or historic), point parameters, instructions, and variables for processor 206 as well as any other suitable information. Memory 208, can be made up of one or more modules of one or more different types of memory, and may be configured to store data and other information as well as operational instructions that may be used by processor 206 to execute via anomaly managing client circuit 210.

Although the example of FIG. 2 is illustrated using processor and memory circuitry, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up anomaly managing client circuit 210.

Communication circuit 201 may comprise either or both wireless transceiver circuit 202 with antenna 208 and wired I/O interface 204 with an associated hardwired data port (not illustrated). As this example illustrates, communications with anomaly managing client circuit 210 can include either or both wired and wireless communications circuits 201. Wireless transceiver circuit 202 can include a transmitter and a receiver (not shown) to allow wireless communications via any of a number of communication protocols such as, for example, Wi-Fi®, Bluetooth®, near field communications (NFC), Zigbee®, and any of a number of other wireless communication protocols whether standardized, proprietary, open, point-to-point, networked or otherwise.

Antenna 208 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by anomaly managing client circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet® or any of a number of other wired communication protocols whether standardized, proprietary, open, point-to-point, networked or otherwise.

The power supply (incorporated with any of the features herein) can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle 100, with which vehicle 200 is implemented. In the illustrated example, sensors 152 include vehicle acceleration sensors 212, vehicle speed sensors 214, wheelspin sensors 216 (e.g., one for each wheel), tire pressure monitoring system (TPMS) 220, accelerometers such as 3-axis accelerometer 222 to detect roll, pitch and yaw of the vehicle, vehicle clearance sensors 224, left-right and front-rear slip ratio sensors 226, and environmental sensors 228 (e.g., to detect salinity or other environmental conditions). Additional sensors 232 can also be included as may be appropriate for a given implementation of vehicle 200.

In some examples, sensors 152 may also include one or more sensors that are operable to measure a roadway environment outside of vehicle 200. For example, sensors 152 may include one or more sensors that record one or more physical characteristics of the roadway environment that is proximate to vehicle 200.

In some examples, sensors 152 may also include one or more sensors that record an environment internal to a cabin of vehicle 200. For example, sensors 152 includes onboard sensors which monitor the environment of vehicle 200 whether internally or externally. In a further example, sensors 152 includes cameras, LIDAR, radars, infrared sensors, and sensors that observe the behavior of the driver such as internal cameras, biometric sensors, etc. In some examples, sensors 152 may include one or more of the following vehicle sensors: a camera; a LIDAR sensor; a radar sensor; a laser altimeter; an infrared detector; a motion detector; a thermostat; and a sound detector. Sensors 152 may also include one or more of the following sensors: a carbon monoxide sensor; a carbon dioxide sensor; an oxygen sensor; a mass air flow sensor; and an engine coolant temperature sensor. Sensors 152 may also include one or more of the following sensors: a throttle position sensor; a crank shaft position sensor; an automobile engine sensor; a valve timer; an air-fuel ratio meter; and a blind spot meter. Sensors 152 may also include one or more of the following sensors: a curb feeler; a defect detector; a Hall effect sensor, a manifold absolute pressure sensor; a parking sensor; a radar gun; a speedometer; and a speed sensor. Sensors 152 may also include one or more of the following sensors: a tire-pressure monitoring sensor; a torque sensor; a transmission fluid temperature sensor; and a turbine speed sensor (TSS); a variable reluctance sensor; and a vehicle speed sensor (VSS). Sensors 152 may also include one or more of the following sensors: a water sensor; a wheel speed sensor; and any other type of automotive sensor.

Sensors 152 may generate sensor data. For example, the sensor data may comprise digital data describing one or more sensor measurements of sensors 152. For example, the sensor data may include vehicle data describing vehicle 200 (e.g., GPS location data, speed data, heading data, etc.), driver, and other sensor data describing a roadway environment (e.g., camera data depicting a roadway or a vehicle's proximity to other vehicles, etc.).

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, anomaly managing client circuit 210 can receive information from various vehicle sensors to determine whether a remote operator should be ready to operate the vehicle by performing the driving operations, or be ready to assist the driver of a semi-autonomous vehicle with a limited driving situation from afar. Communication circuit 201 can be used to transmit and receive information between anomaly managing client circuit 210 and sensors 152, and anomaly managing client circuit 210 and vehicle systems 158. Also, sensors 152 may communicate with vehicle systems 158 directly or indirectly (e.g., via communication circuit 201 or otherwise).

Figure 3:
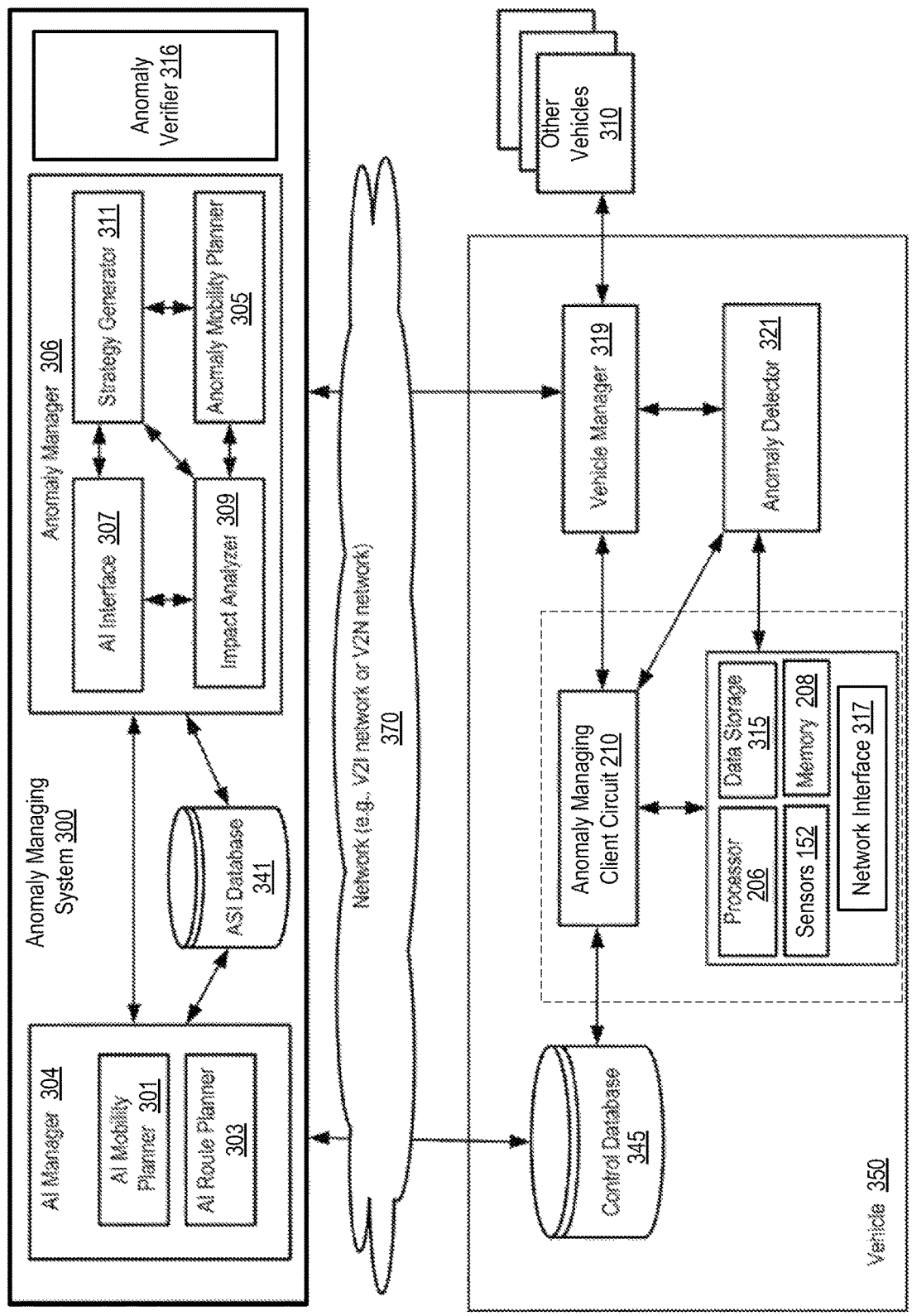
FIG. 3 is a block diagram illustrating an architecture for the anomaly managing system and the anomaly managing client according to some embodiments.

In various embodiments, communication circuit 201 can be configured to receive data and other information from sensors 152 that is used in determining to communicate with anomaly managing system 300 (and anomaly verifier 316), as described with FIG. 3. Additionally, communication circuit 201 can be used to send an activation signal or other activation information to various vehicle systems 158 as part of entering or exiting an anomaly detection and management mode, if applicable to the implemented embodiment.

FIG. 3 is a block diagram illustrating an architecture for anomaly managing system and anomaly managing client according to some embodiments. In this example, anomaly managing system 300 and anomaly managing client circuit 210 are provided. Anomaly managing system 300 may be installed in a server or cloud-based system and vehicle 350 may detect an occurrence of an anomaly as it is operating on a roadway. Vehicle 350 may be affected by the anomaly.

Anomaly managing system 300 may include software that is operable to manage an anomaly and anomaly-affected entities. In some embodiments, anomaly managing system 300 may be implemented using hardware including a field-programmable gate array ("FPGA") or an application-specific integrated circuit ("ASIC"). In some other embodiments, anomaly managing system 300 may be implemented using a combination of hardware and software. Anomaly managing system 300 may be stored in a combination of the devices (e.g., servers or other devices), or in one of the devices.

Anomaly managing system 300 may communicate with ego vehicle 350 (e.g., connected vehicle) and other vehicles 310 via network 370. In some examples, other vehicles 310 may be autonomous vehicles (no passenger and/or driver) or non-autonomous vehicles in the vicinity of a vehicle exhibiting anomalous behavior (e.g., aggressive driving). Anomaly managing system 300 may provide route management instructions (e.g., determined by AI route planner 303) to vehicles 310 that causes them to drive to where the aggressive driver is located, create a barrier for the aggressive driver, and drive in formation to track the position of the aggressive driver so that the barrier is maintained and the dynamics of the aggressive driver are reduced. Reducing the dynamics of the aggressive driver includes, for example, making it harder for the aggressive driver to change lanes or speed up without causing a collision or some other negative consequence for the aggressive driver.

Network 370 may be a wired or wireless network, and may have numerous different configurations including a star configuration, token ring configuration, or other configurations. Furthermore, network 370 may include a local area network (LAN), a wide area network (WAN) (e.g., the Internet), or other interconnected data paths across which multiple devices and/or entities may communicate. In some embodiments, network 370 may include a peer-to-peer network.

Network 370 may be coupled to or may include portions of a telecommunications network for sending data in a variety of different communication protocols. In some embodiments, network 370 includes Bluetooth® communication networks or a cellular communications network for sending and receiving data including via short messaging service (SMS) and multimedia messaging service (MMS). In some embodiments, network 370 includes networks for hypertext transfer protocol (HTTP), direct data connection, wireless application protocol (WAP), e-mail, DSRC, full-duplex wireless communication and mmWave. In some embodiments, network 370 further includes networks for WiFi (infrastructure mode), WiFi (ad-hoc mode), visible light communication, TV white space communication and satellite communication. Network 370 may also include a mobile data network that may include 3G, 4G, LTE, LTE-V2X, LTE-D2D, VoLTE, 5G-V2X or any other mobile data network. Network 370 may also include any combination of mobile data networks. Further, network 370 may include one or more IEEE 802.11 wireless networks.

Vehicle 350 includes various components in addition to or in replacement of other physical components illustrated in vehicle 100 of FIG. 1 and vehicle 200 of FIG. 2. For example, besides the elements described above with reference to FIG. 2, vehicle 350 may include data storage 315, network interface 317, control database 345, vehicle manager 319, and anomaly detector 321, as described herein.

Anomaly detector 321 may include code and routines for detecting an occurrence of an anomaly in the roadway environment. For example, anomaly detector 321 may detect the occurrence of the anomaly by performing operations described in U.S. patent application Ser. No. 16/273,134, filed on Feb. 11, 2019, titled "Anomaly Mapping by Vehicular Micro Clouds," the entirety of which is incorporated herein by reference.

Vehicle manager 319 may include code and routines for performing coordination with other vehicles 310 via V2X communications. For example, vehicle manager 319 may manage (e.g., establish and maintain) inter-vehicular wireless links and control executions of collaborative operations among vehicles 310.

Anomaly managing client circuit 210 of vehicle 350 may cause vehicle manager 319 to send sensor data recorded by vehicle 350 to anomaly managing system 300. The sensor data can be recorded by sensors 152 and forwarded to anomaly managing client circuit 210 and anomaly detector 321.

Anomaly managing client circuit 210 may also receive anomaly data describing the vehicle exhibiting anomalous behavior from anomaly detector 321. Anomaly managing client circuit 210 may send, via vehicle manager 319, the anomaly data to anomaly managing system 300.

Anomaly managing system 300 may comprise Artificial Intelligence (AI) manager 304, ASI database 341, anomaly verifier 316, and anomaly manager 306. AI manager 304, in some examples, may include AI mobility planner 301 and AI route planner 303.

AI mobility planner 301 is operable to continuously monitor mobility information of connected entities (e.g., vehicles) and store current route information and predicted route information of the connected entities. AI mobility planner 301 may generate the hierarchical AI data based at least on the current route information and predicted route information of the connected entities and any other information of the connected entities (e.g., speed data, heading data, etc.).

AI route planner 303 may be operable to plan routes for the connected entities based on the hierarchical AI data. In some embodiments, AI route planner 303 may assist anomaly manager 306 to plan routes for the anomaly-affected entities responsive to the occurrence of the anomaly.

Anomaly manager 306, in some examples, may include one or more of the following elements: anomaly mobility planner 305, AI interface 307, impact analyzer 309, and strategy generator 311.

Anomaly mobility planner 305 may be operable to monitor information of anomalies present in the roadway environment. This information may include, for example, location information, description information, and any other information related to the anomaly.

AI interface 307 may be operable to retrieve hierarchical AI data associated with the roadway environment from AI manager 304.

Impact analyzer 309 may be operable to determine an impact of the anomaly. Impact analyzer 309 may also determine an influence region of the anomaly based on one or more roadway condition parameters and the impact of the anomaly. Impact analyzer 309 determines a set of anomaly severity indices associated with a set of sub-regions within the influence region.

In some embodiments, the anomaly data and the set of anomaly severity indices are stored in ASI database 341.

Strategy generator 311 may be operable to manage anomaly-affected entities within the influence region based on the set of anomaly severity indices. For example, for each sub-region from the set of sub-regions, strategy generator 311 identifies, one or more anomaly-affected entities within the sub-region. Strategy generator 311 generates a corresponding control strategy to manage the one or more anomaly-affected entities in the sub-region based on a corresponding anomaly severity index associated with the sub-region. Strategy generator 311 instructs the one or more anomaly-affected entities in the sub-region to execute the corresponding control strategy. As a result, strategy generator 311 generates a set of control strategy to manage anomaly-affected entities in the influence region based on the set of anomaly severity indices.

For example, with respect to vehicle 350 which is affected by the anomaly, strategy generator 311 identifies that vehicle 350 is present within a particular sub-region that is associated with a particular anomaly severity index. Strategy generator 311 generates a control strategy for vehicle 350 based on the particular anomaly severity index. Strategy generator 311 sends strategy data describing the control strategy to vehicle 350. After receiving the strategy data, anomaly managing client circuit 210 of vehicle 350 may store the strategy data in control database 345. Anomaly managing client circuit 210 may inform vehicle manager 319 about the received strategy data. Anomaly managing client circuit 210 ensures that vehicle manager 319 follows the control strategy described by the strategy data so that vehicle 350 operates in accordance with the control strategy to mitigate an effect of the anomaly. For example, assume that the control strategy instructs vehicle 350 to change a lane immediately. Then, vehicle manager 319 can modify an operation of an ADAS system of vehicle 350 so that the ADAS system controls vehicle 350 to change its lane immediately.

Anomaly verifier 316 may be operable to receive an identification of abnormal driving performed by the second vehicle and verify whether the identification of the abnormal driving is accurate by generating a confirm or deny decision. For example, the identification may be transmitted from vehicle 350 (e.g., ego vehicle) about a second vehicle (e.g., other vehicles 310). Anomaly verifier 316 may initiate a verification process of the identification of the abnormal driving and access driving data associated with an origin of the abnormal driving. The origin of the abnormal driving may be determined, for example, by retracing the operations performed by the second vehicle using the sensor data, by reviewing regional or local driving behavior analysis and comparing the operations performed by the second vehicle with operations performed in the regional or local geographical location, or by identifying reoccurring and repeated abnormal driving behavior in learned trends for the location. Using the driving data, anomaly verifier 316 may determine and provide a confirm or deny decision regarding the identification of the second vehicle. Additional detail of the process performed by anomaly verifier 316 is provided with FIG. 5.

Figure 4:
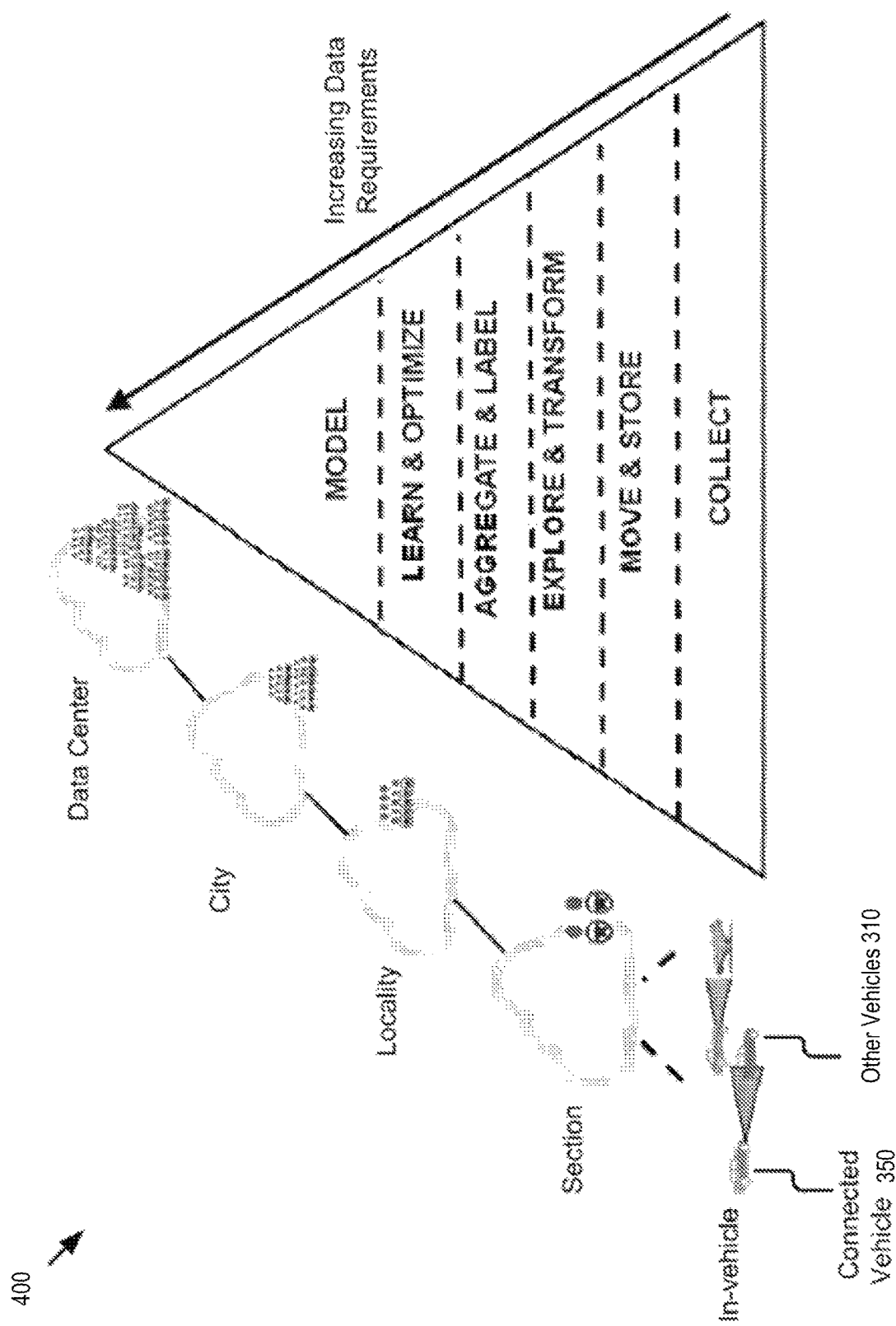
FIG. 4 is a graphical representation illustrating an example approach for learning hierarchical AI data according to some embodiments.

FIG. 4 is a graphical representation illustrating an example approach for learning hierarchical AI data according to some embodiments. In the example approach 400, the hierarchical AI data is learned hierarchically from large scale and fragmented vehicle data (e.g., sensor data from vehicles) in real time by anomaly managing system 300. The vehicles can include, for example, ego vehicle 350 and other vehicles 310 illustrated in FIG. 3.

For example, vehicle 350 can detect apparent abnormal driving of a single vehicle and anomaly managing system 300 can verify the abnormal driving specifically at the section, locality, and city levels where the single vehicle is operating, as illustrated in FIG. 4. As an illustrative example, a city-level manager operating anomaly managing system 300 can help verify the abnormal driving at the city level with multiple vehicles reporting identifications of abnormal driving of other vehicles concurrently. As another illustrative example, a section manager operating anomaly managing system 300 can help verify abnormal driving in their section. The section may correspond with the same locality, or among locality managers under same city, etc.

Various types of vehicle data are collected including, but not limited to, instrumentation data, logging data, sensor data, or any other type of data. Reliable streams of data can be stored in data storages (either structured or unstructured data storages) so that a reliable data flow can be established.

The data collected through the reliable data flow is explored and transformed via, e.g., data cleaning and data preparation, etc. Any missing data in the data flow can be identified.

Business intelligence can be used to define metrics to track and evaluate the data. For example, various analytics methods and different metrics can be used to evaluate the data. The data can be aggregated and labeled. Features of the data can be extracted and used as training data to train a machine learning model. In some examples, the features of the data can be extracted and used with a time series analysis or pattern matching (e.g., to help determine the origin of the abnormal behavior before the ego vehicle identifies that the vehicle is operating abnormally). After a series of operations are performed on the data, the data can be modeled using one or more data models.

With the identification, detection, and tracking of abnormal behavior exhibited by vehicles on a roadway, the system may also verify that the determination of abnormal behavior by a particular vehicle (e.g., the second vehicle that is different than the ego vehicle) is accurate before instructing other vehicles to perform actions in response to the identification of abnormal behavior. For example, the system may verify the origin of the determination by the ego vehicle of abnormal behavior allegedly performed by the second vehicle, as illustrated in FIG. 5.

Figure 5:
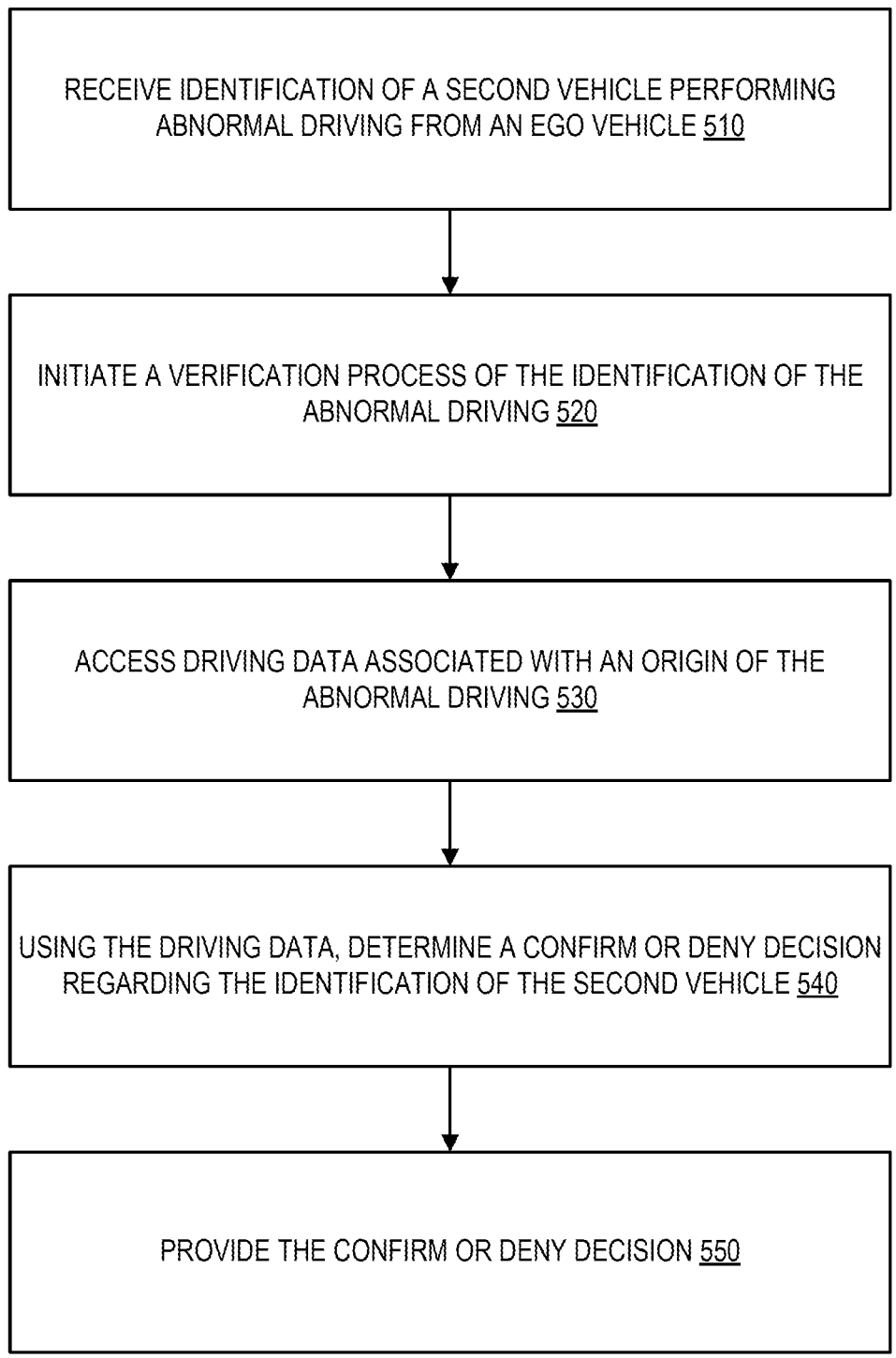
FIG. 5 illustrates a process for programmatically verifying the origin of abnormal driving in accordance with some embodiments of the systems and methods described herein.

FIG. 5 illustrates a process for programmatically verifying the origin of abnormal driving in accordance with some embodiments of the systems and methods described herein. In some examples, the process may be implemented at anomaly managing system 300 of FIG. 3 and the ego vehicle may correspond with vehicle 100 of FIG. 1, vehicle 200 of FIG. 2, or vehicle 350 of FIG. 3.

At block 510, the method comprises receiving the identification of a second vehicle performing abnormal driving from an ego vehicle. For example, the ego vehicle (corresponding with vehicle 100 of FIG. 1, vehicle 200 of FIG. 2, or vehicle 350 of FIG. 3) may collect sensor data, observation data, and the like to classify the behavior of a driver in the second vehicle as performing abnormal driving. Some examples of abnormal driving may include aggressive driving (e.g., tailgating, cut-in lane, etc.), distracted driving (e.g., swerving, delayed reaction, etc.), or reckless driving (e.g., green light running, lane change without signaling, etc.). The ego vehicle may use predicted values generated from sensor data (e.g., predicted distance to the nearby other vehicle through the backup camera) to detect an identification of abnormal driving by the second vehicle. The ego vehicle may transmit the determination of the identification of a second vehicle performing abnormal driving to the anomaly managing system via network (e.g., network 370 of FIG. 3).

At block 520, the method comprises initiating a verification process of the identification of the abnormal driving performed by the second vehicle. In some examples, the anomaly managing system may collect data from the ego vehicle, the second vehicle, or other surrounding vehicles as part of the verification process.

As an illustrative example, the second vehicle may be following the ego vehicle too closely. The data transmitted by the ego vehicle to the anomaly managing system may include, for example, a parameter value corresponding with the distance between the two vehicles, a sensor value corresponding with a camera or other image sensor, and an algorithm value corresponding with a trained machine learning model to detect the abnormal driving. In other examples, the data may correspond with input to provide to a time series analysis or pattern matching analysis, either of which may be used by the anomaly managing system as the input data to generate the analysis.

In some examples, the ego vehicle may provide data to the anomaly managing system to support its decision about the identification of a second vehicle performing abnormal driving. In some examples, this data to confirm the determination of abnormal driving may be referred to as metadata to the determination, although other sensor data may be used as well. The data may include, for example, a set of parameters (e.g., distance, speed) used in the abnormal driving detection, a set of sensors (e.g., camera, radar) used to measure the parameters of the subject vehicle, a type of algorithm (e.g., time-series analysis, machine learning) used to analyze the parameters, and a sample abnormal driving detection result. The ego vehicle can provide the data using a network like Vehicle-to-X communication network (e.g., Vehicle-to-Vehicle (V2V), Vehicle-to-Infrastructure (V2I), Vehicle-to-Cloud (V2C), etc.) to transmit the data.

If the second vehicle is a connected vehicle, the second vehicle may also provide sensor data to the anomaly managing system (e.g., the status of the driver of the second vehicle using sensor data internal or external to the second vehicle). The anomaly managing system can communicate with the second vehicle and request from it data in determining whether the driver is acting in coordination with abnormal driving behavior. The second vehicle can use internal sensors (e.g., in-cabin camera, gas/brake pedal positions, etc.) and conclude about its driver is either abnormal or not. Similarly, the second vehicle may construct data (e.g., metadata) about its conclusion that can be transmitted via the network to the anomaly managing system.

If the second vehicle is not a connected vehicle, the anomaly managing system may receive data from the Vehicle-to-X communication network (e.g., Vehicle-to-Vehicle (V2V), Vehicle-to-Infrastructure (V2I), Vehicle-to-Cloud (V2C), etc.) or other sensors that may have captured actions performed by the second vehicle prior to the determination by the ego vehicle that the second vehicle is performing abnormally.

At block 530, the method comprises accessing driving data associated with an origin of the abnormal driving. The driving data may include the ego vehicle and the second vehicle. In this example, the anomaly managing system can review and mine the data to determine actions of the second vehicle over time. The decision could be done according to precision levels of sensors or accuracy of the algorithms used in the determination.

In some examples, the system can communicate with section managers or locality managers and retrieve data regarding the subject vehicle in order to help determine the origin of the abnormal driving, as illustrated in FIG. 4. The section managers or locality managers may be within a threshold distance of the second vehicle or ego vehicle. Through analysis of such data, the system can find the origin of abnormal driving by comparing data and determinations from multiple sources.

In an illustrative example of the data utilized in determining the origin of the abnormal driving, the data may identify that the driver of the second vehicle has abrupt gas and brake pedal changes over time. The ego vehicle can predict the distance between the second vehicle and other vehicles through a backup camera incorporated with ego vehicle. In some examples, the parameter sensing used in the backup camera analysis may suffer from noise and could be misleading or in need of verification. The anomaly managing system communicates with the second vehicle to determine that the Accelerator Pedal Position Sensor is accurate in sensing (e.g., and confirm that the detection of the abnormal driving is accurate).

In some examples, the origin may be determined by retracing the operations performed by the second vehicle using the sensor data. For example, the system may retrace operations performed by the second vehicle by stepping back in time to uncover the root-cause of the initially detected abnormal driving behavior. The root-cause may help determine whether a reasonable explanation exists for the abnormal driving behavior. Such back tracking may involve a threshold time period of actions performed by the second vehicle and captured by another connected vehicle. The actions may be captured at a time even before any abnormal driving behavior can be detected.

When retracing is implemented, the system can process sensor data retrieved from the vehicles from time instances prior to the abnormal driving behavior being flagged. For example, if the ego vehicle flags the second vehicle for swerving, the system can retrieve sensor data from a time period prior to the second vehicle swerving to determine the cause of the swerving maneuver. Accordingly, if there is a valid reason for the second vehicle performing an abnormal driving maneuver, based on the data leading up to the abnormal driving maneuver, the system determines that the second vehicle is not driving abnormally.

In some examples, the origin may be determined by a regional or local driving behavior analysis and comparing the operations performed by the second vehicle with operations performed in the regional or local geographical location (e.g., as discussed herein with reference to FIG. 4). The determination of the origin of the abnormal driving behavior may change what would be considered abnormal driving for that region (e.g., changes in local/state driving laws by region or across state lines). The regional or local behavior may be received or learned from driving trends or behavior in geographical locations or at certain times of the day or days of the week.

In an illustrative example, the geographical location may commonly include drivers entering an intersection to wait to make a left-hand turn at a green light. If this behavior was implemented in City A, the behavior may be identified as abnormal by other drivers, but if this behavior was implemented in City B, the behavior may be identified as completely normal (and encouraged) by other drivers. The regional or local behavior of City B may be incorporated with the verification process. For example, the second vehicle may enter the intersection to wait to make a left-hand turn at the green light, the ego vehicle can detect the abnormal driving behavior, and the system can deny the determination that the second vehicle is conducting abnormal behavior. This decision may be determined during the verification process and determine that the behavior is actually normal for the geographic region (and deny the identification of the abnormal driving behavior).

When detection of regional or local behavior is implemented, the system can receive sensor data from multiple vehicles in a particular region at a particular time of day. The system can process the sensor data to determine if there are any common vehicular maneuvers that are performed in certain locations or at certain times of the day.

For example, the system may aggregate and process data from multiple vehicles, where the data is indicative of a substantial number of vehicles speeding up as the vehicles enter a particular location. This may occur where, as an example, vehicles leave one state known to enforce speed limits aggressively and enter a new state that does not enforce speed limits as heavily. Accordingly, if this is a local trend, the occurrence of a vehicle accelerating rapidly and speeding is not abnormal, and as such, the system does not label a vehicle who performs in this manner as driving abnormally based on the regional trends received or learned for a given circumstance.

As another example, the server may aggregate and process data from multiple vehicles, where the data is indicative of a substantial number of vehicles driving erratically (e.g., speeding, failing to stop at stop signs, etc.) at a particular time/day of the week. This may occur where, for example, vehicles are driving during rush hour on a weekday where congestion and aggressive driving may be the norm in certain locations known to create bottlenecks during rush hour. Accordingly, if this is a known trend for a specific time/day of the week, the mislabeling at the vehicle level for this type of driving at these specific times/days will be corrected and deemed "normal." Therefore, by correlating abnormal driving behaviors to specific locations, times of day, and days of the week, the system can verify when driving is actually abnormal or whether driving is acceptable based on local trends. The system may do so by expanding the root-cause analysis to include not only previous events that led to the abnormal driving, but also consider local rules, regional trends, and region-based changes in driving behaviors.

In some examples, the origin may be determined by learned trends to identify reoccurring and repeated abnormal driving behavior that has been previously reported. The previous reporting may be associated with a specific location or under similar circumstances that would detect a trend and reasonable explanation for the abnormal driving behavior.

When learned trends are implemented, the system identifies past occurrences to help explain whether a vehicle is driving abnormally or normally in a given situation. Similar to the trend analysis, the system can use previous "abnormal driving" reports from other vehicles at a particular location and/or under a similar set of facts to determine that some external variable may cause vehicles to respond a certain way that appears "abnormal" but given a history of similar occurrence may determine the behavior as normal (e.g., a normal response to a pothole, deer crossing, sunset/sunrise, pedestrian/biker lanes, etc.). In some examples, the system can review a trend at a micro-level and specific to a location (e.g., lane) where the occurrence may not be consistent with other lanes, direction of traffic, other streets, etc.

At block 540, the method comprises, using the driving data, determining a confirm or deny decision regarding the identification of the second vehicle from the ego vehicle. As an illustrative example, the system may determine a different outcome than the determination made by the ego vehicle. For example, the second vehicle may provide data that identifies its driver is acting normally (e.g., not distracted or aggressive) and the origin of abnormal driving is the ego vehicle. In such a case, the second vehicle can provide additional data about its decision to the system. The details can include the same metadata formatting or logic provided by the ego vehicle.

At block 550, the method comprises providing the confirm or deny decision to an exterior location. For example, the system may transmit the confirm or deny decision to the ego vehicle (e.g., where the ego vehicle and the second vehicle are exterior to anomaly managing system 300 of FIG. 3). In another example, the system can request feedback from a driver of the ego vehicle or second vehicle to acknowledge the confirm or deny decision. In another example, the system may distribute the identification of the confirmed abnormally driving, high-risk vehicle or driver information (e.g., the second vehicle) across the network to caution any impacted vehicles and so they may react accordingly.

In some examples, the system may not have the final conclusion relating to the confirm or deny decision to provide to the ego vehicle. In such a case, a remote operator (e.g., human support) may be initiated (e.g., as the exterior location). The driving data, metadata, and temporary confirm or deny decision may be provided to the remote operator. The remote operator may be located remotely from the anomaly managing system and a final decision may be generated by the remote operator, which may subsequently be provided to the ego vehicle.

Figure 6:
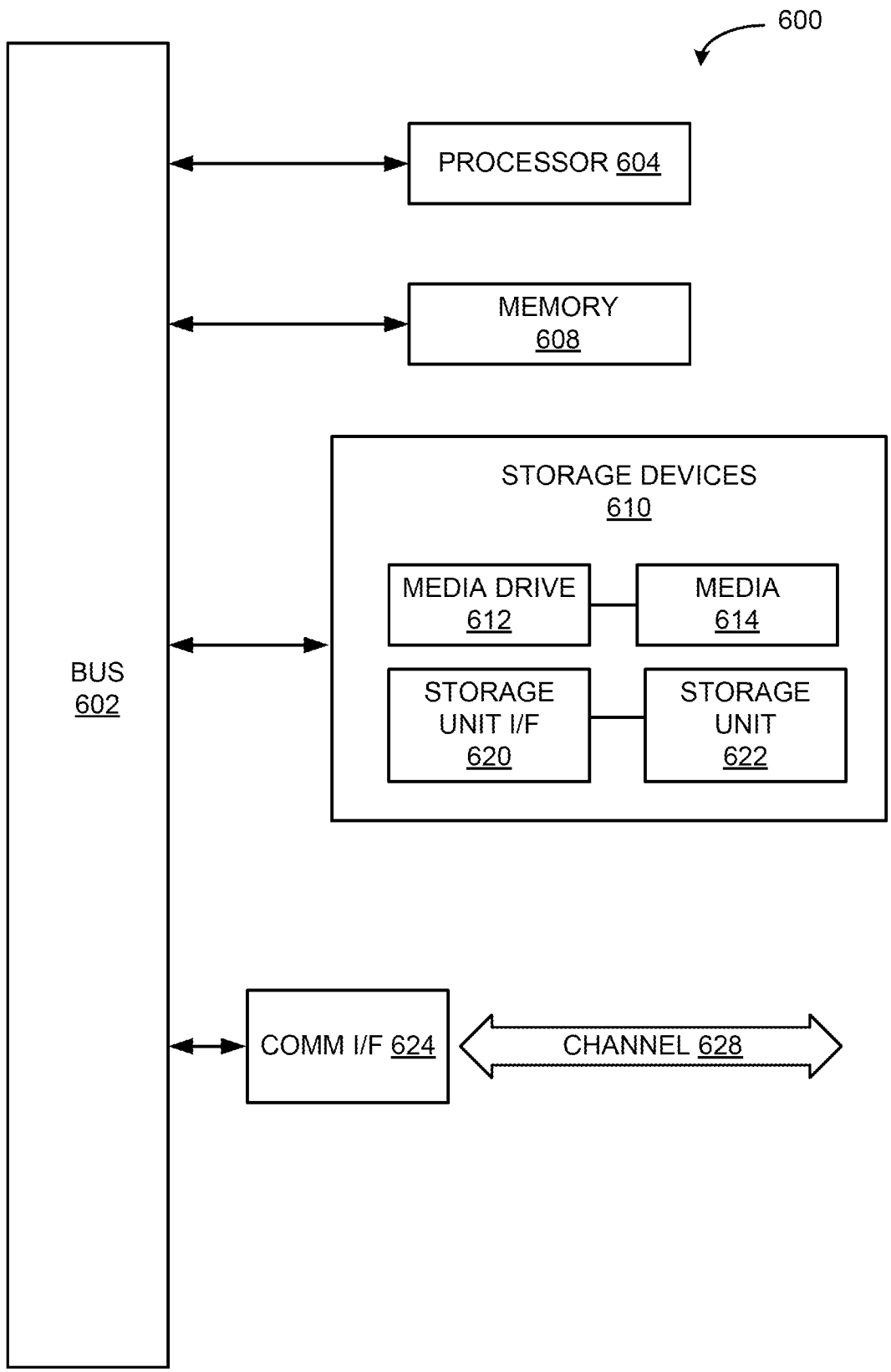
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, and/or any one or more of the components making up vehicle 100 of FIG. 1, vehicle 200 of FIG. 2, or vehicle 350 or anomaly managing system 300 of FIG. 3. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

Computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 624. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for verifying an identification of abnormal driving performed by a subject vehicle, the system comprising:
    a memory; and
    one or more processors that are configured to execute machine readable instructions stored in the memory to:
        determine abnormal driving performed by the subject vehicle for a current environmental condition, wherein the determination is based on past identifications of abnormal driving from other vehicles at a lane of the subject vehicle, and further wherein the past identifications are determined in association with corresponding environmental conditions at a time of such identifications;
        initiate a verification process of the identification of the abnormal driving performed by the subject vehicle;
        access driving data associated with an origin of the abnormal driving, wherein the driving data includes driving data of an ego vehicle and the subject vehicle;
        using the driving data, confirm whether the abnormal driving by the subject vehicle is occurring;
        based on the confirmation, wirelessly transmit identification information regarding the identification of abnormal driving performed by the subject vehicle to the ego vehicle; and
        modify an operation of an advanced-driver assistance system (ADAS) of the ego vehicle to execute an ADAS maneuver with the ego vehicle based on the confirmation.

2. The system of claim 1, wherein the driving data associated with the origin of the abnormal driving is received from a section manager or a locality manager where the ego vehicle or the subject vehicle travels.

3. The system of claim 1, wherein the ego vehicle generates the identification of the subject vehicle using a trained machine learning model generated and trained by the anomaly managing system.

4. The system of claim 1, wherein the ego vehicle generates the identification of the subject vehicle using a time series analysis or pattern matching generated by the anomaly managing system.

5. The system of claim 1, wherein the driving data includes a geographic location of the subject vehicle.

6. The system of claim 1, wherein the origin is determined by retracing operations performed by the subject vehicle by stepping back in time to uncover a root-cause of the abnormal driving performed by the subject vehicle.

7. The system of claim 1, wherein the origin is determined by comparing operations performed by the subject vehicle with regional or local driving behavior.

8. The system of claim 1, wherein the origin is determined by identifying reoccurring and repeated abnormal driving behavior that has been previously reported.

9. The anomaly managing system of claim 1, wherein the confirmation is provided to the ego vehicle, the instructions further to:
    request feedback from a driver of the ego vehicle or subject vehicle to acknowledge the confirmation.

10. The system of claim 1, wherein the confirmation is provided to the ego vehicle, the instructions further to:
    distribute identification of the subject vehicle to other vehicles.

11. The system of claim 1, wherein the confirmation is provided to a human operator.

12. A non-transitory machine-readable medium associated with a system having instructions stored therein, which when executed by a processor, cause the processor to perform operations, the operations comprising:
    determining abnormal driving performed by a subject vehicle for a current environmental condition, wherein the determination is based on past identifications of abnormal driving from other vehicles at a lane of the subject vehicle, and further wherein the past identifications are determined in association with corresponding environmental conditions at a time of such identifications;
    initiating a verification process of the identification of the abnormal driving performed by the subject vehicle;
    accessing driving data associated with an origin of the abnormal driving, wherein the driving data includes driving data of at least one of the other vehicles and the subject vehicle;
    using the driving data, confirm whether the abnormal driving by the subject vehicle is occurring;
    based on the confirmation, wirelessly transmitting identification information regarding the identification of abnormal driving performed by the subject vehicle to the other vehicles; and modifying an operation of an advanced-driver assistance system (ADAS) of the other vehicles to execute an ADAS maneuver with the other vehicles based on the confirmation.

13. The non-transitory machine-readable medium of claim 12, wherein the driving data associated with the origin of the abnormal driving is received from a section manager or a locality manager where the subject vehicle travels.

14. The non-transitory machine-readable medium of claim 12, wherein an ego vehicle generates the identification of the subject vehicle using a trained machine learning model generated and trained by the anomaly managing system.

15. The non-transitory machine-readable medium of claim 12, wherein an ego vehicle generates the identification of the subject vehicle using a time series analysis or pattern matching generated by the anomaly managing system.

16. The non-transitory machine-readable medium of claim 12, wherein the driving data includes a geographic location of the subject vehicle.

17. The non-transitory machine-readable medium of claim 12, wherein the origin is determined by retracing operations performed by the subject vehicle by stepping back in time to uncover a root-cause of the abnormal driving performed by the subject vehicle.

18. The non-transitory machine-readable medium of claim 12, wherein the origin is determined by comparing operations performed by the subject vehicle with regional or local driving behavior.

19. The non-transitory machine-readable medium of claim 12, wherein the origin is determined by identifying reoccurring and repeated abnormal driving behavior that has been previously reported.

20. The non-transitory machine-readable medium of claim 12, wherein the confirmation is provided to the subject vehicle, and wherein the operations further comprising:
   requesting feedback from a driver or subject vehicle to acknowledge the confirmation.

* * * * *